US006826986B2

United States Patent
Lim et al.

(10) Patent No.: US 6,826,986 B2
(45) Date of Patent: Dec. 7, 2004

(54) BI-DIRECTIONAL SINGULATION SYSTEM AND METHOD

(76) Inventors: Ah Beng Lim, Blk 123, Rivervale St. #12-802, Singapore, 540132 (SG); Eng Hwa Chua, Blk 531 Choa Chu Kang St. 51 #05-321, Singapore, 680531 (SG); Steven John Diprinzio, 11412 N. Twin Spur Ct., Oro Valley, 85737, AZ (US)

( * ) Notice: Subject to any disclaimer, the term of this patent is extended or adjusted under 35 U.S.C. 154(b) by 96 days.

(21) Appl. No.: 10/137,996

(22) Filed: May 3, 2002

(65) Prior Publication Data

US 2002/0162438 A1 Nov. 7, 2002

Related U.S. Application Data

(63) Continuation-in-part of application No. 09/849,049, filed on May 5, 2001.

(51) Int. Cl.[7] .................................................. B28D 1/04
(52) U.S. Cl. .................................. 83/13; 83/73; 83/279; 451/6; 451/190; 125/13.01
(58) Field of Search ............................. 83/279, 280, 73, 83/452, 75, 76.8, 863, 76.1, 169, 367, 368, 370, 864, 883, 508.1; 451/5, 6, 10, 41, 194, 190, 195, 197; 125/13.01, 12, 14, 35

(56) References Cited

U.S. PATENT DOCUMENTS

| 4,688,540 | A | * | 8/1987 | Ono | 125/13.01 |
|---|---|---|---|---|---|
| 5,249,491 | A | * | 10/1993 | Carter | 83/13 |
| 6,102,023 | A | * | 8/2000 | Ishiwata et al. | 125/13.01 |
| 6,142,138 | A | * | 11/2000 | Azuma et al. | 125/14 |
| 6,277,001 | B1 | * | 8/2001 | Saito | 451/41 |
| 6,345,616 | B1 | * | 2/2002 | Umahashi | 125/13.01 |
| 6,346,034 | B1 | * | 2/2002 | Leng | 451/58 |
| 6,354,912 | B1 | * | 3/2002 | Osada et al. | 451/41 |
| 6,357,330 | B1 | * | 3/2002 | Dass et al. | 83/863 |
| 6,422,227 | B1 | * | 7/2002 | Kobayashi et al. | 125/13.01 |
| 6,494,122 | B2 | * | 12/2002 | Kamigaki | 83/13 |
| 6,527,627 | B2 | * | 3/2003 | Arai | 451/41 |

* cited by examiner

*Primary Examiner*—Allan N. Shoap
*Assistant Examiner*—Alie Ghassem

(57) ABSTRACT

A sawing system (200) incorporates a vision zone (220) between a loading/unloading zone (115) and a sawing zone (210). This arrangement allows a dual spindle counter rotating saw assembly (230) to be more rigidly mounted, which reduces the displacement of the saw assembly during the sawing process. This, advantageously reduces the variation in the cut made by the saw blades of the saw assembly to comply with a predetermined required tolerance. In addition, with the vision zone (220) located between the loading/unloading zone (115) and the sawing zone (210), a semiconductor wafer or substrate is transported from the loading/unloading zone (115) to the vision zone (220) without passing the sawing zone (210). Consequently, exposure of a semiconductor wafer or substrate to water or debris from the sawing process is avoided, and imaging can be performed at the vision zone (220) without water or debris adversely affecting the imaging.

3 Claims, 8 Drawing Sheets

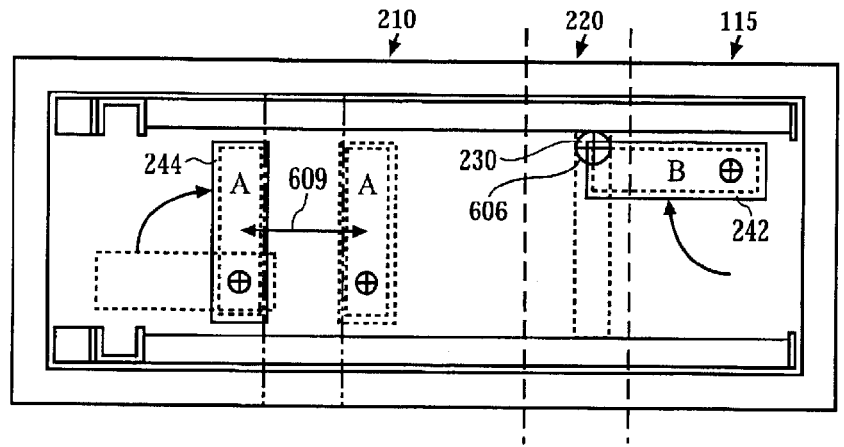
FIG. 6.5
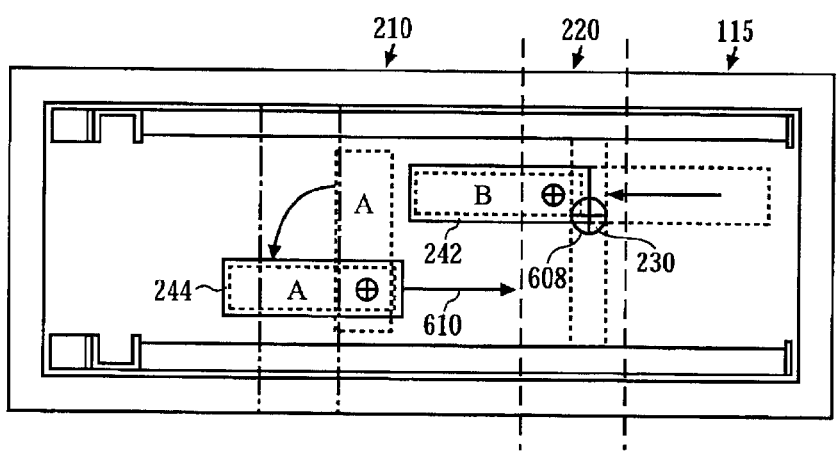
FIG. 6.6
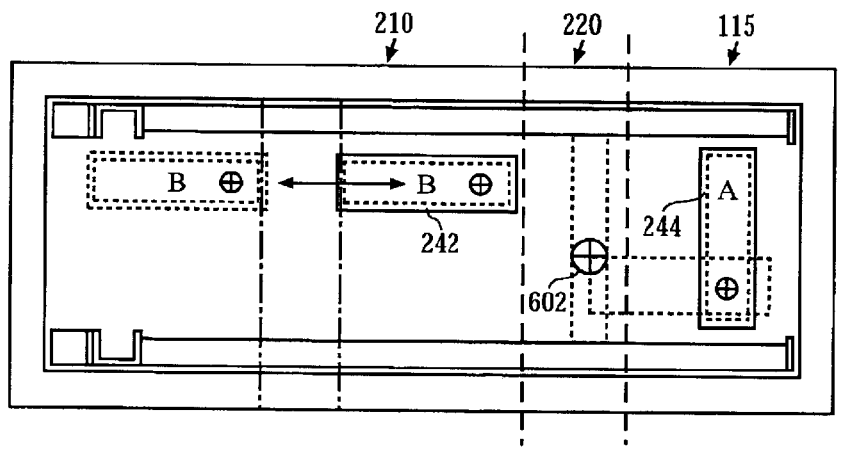
FIG. 6.7

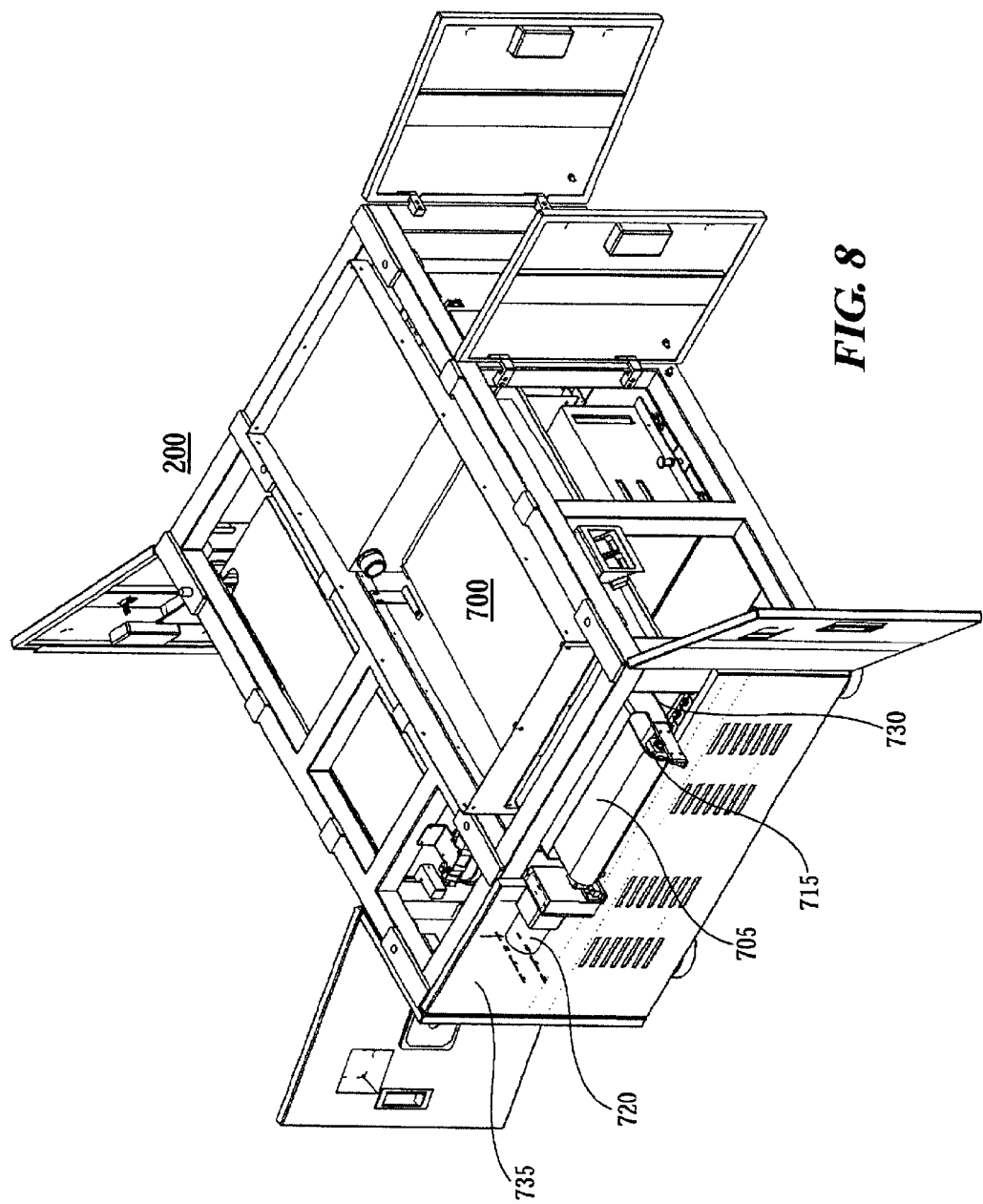

BI-DIRECTIONAL SINGULATION SYSTEM AND METHOD

This application is a continuation-in-part of Ser. No. 09/849,049 filed on May 5, 2001 which is incorporated herein by reference.

FIELD OF THE INVENTION

The present invention relates to a sawing system having a plurality of rotating saw blades adapted to cut or saw, substrates or semiconductor wafers, in two opposite directions of relative movement at a sawing zone, and more particularly to a sawing system having a vision zone incorporated between a loading/unloading zone and the sawing zone.

BACKGROUND OF THE INVENTION

A singulation saw, hereinafter referred to as a sawing system, for sawing either substrate or semiconductor wafers using a pair of counter rotating saw blades is disclosed in co-pending patent application Ser. No. 09/849,049 titled "BI-DIRECTIONAL SINGULATION SAW AND METHOD" filed on May 5, 2001, and assigned to the same assignee as the present patent application, and which is incorporated herein by reference thereto.

With reference to FIG. 1, the disclosed sawing system 100 is coupled to a prior art handler 105, and the disclosed sawing system 100 primarily comprises three processing zones. The three processing zones are physically arranged relative to each other with a sawing zone 110 located between a loading/unloading zone 115, and a vision zone 120. A dual spindle counter rotating saw 125 is used in the sawing zone 110, and a vision system 129 that employs a camera is employed in the vision zone 120.

A transport system transports the substrates or semiconductor wafers between the unloading/unloading zone 115, the sawing zone 110, and the vision zone 120; and the transport system also transports the substrates or semiconductor wafers in a reciprocating movement during the sawing process in the sawing zone 110. The transport system comprises a pair of linear transport means that transport two rotatable carrier supports 122 and 124 along transport paths 129 and 130, respectively. Each of the two rotatable carrier supports 122 and 124 are adapted for loading a removable carrier thereon. The substrates or semiconductor wafers for sawing are removably mounted on one such carrier.

During the sawing process, for example, when singulating a semiconductor wafer, the handler 105 loads a carrier, with the semiconductor wafer thereon, at the loading/unloading zone 115 onto one of the carrier supports 122 of the sawing system 100. The transport system then transports the wafer past the sawing zone 110, to the vision zone 120. After the vision system 129 has captured the necessary images of the wafer for alignment purposes and the like, the transport system then transports the wafer from the vision zone 120 to the sawing zone 110. At the sawing zone 110, the wafer is singulated by the dual spindle counter rotating saw 125, using the alignment information from the vision system. The dual spindle counter rotating saw 125 is movably mounted along the Y and Z axes, and the rotatable carrier support 122 allows the wafer to be sawn along the X and Y axes. When the dual spindle counter rotating saw 125 has completed singulation of the wafer, the singulated wafer is transported by the transport system to the loading/unloading zone 115, where the carrier with the singulated wafer thereon is unloaded from the carrier support 122 at the loading/unloading zone 115 by the handler 105.

The transport system can transport two wafers at a time such that, while a first wafer on the carrier support 122 is being singulated in the sawing zone 110, a second wafer on the other carrier support 124 is transported from the loading/unloading zone 115 to the vision zone 120, where the necessary images of the wafer are captured. Then, after the first wafer has been singulated in the sawing zone 110, as the first wafer is being transported from the sawing zone 110 to the loading/unloading zone 115, the second wafer at the vision zone 120 is transported to the sawing zone 110 and sawing of the second wafer can then begin.

A disadvantage of this arrangement is that the second wafer passes the sawing zone 110 while the first wafer is being sawn. Consequently, as the sawing process involves the use of water to cool the saw blades as well as to wash away debris, the water from the sawing process tends to wet the second wafer, which adversely affects the subsequent imaging of the second wafer in the vision zone 120.

In order for the transportation system to be able to transport substrates or semiconductor wafers between the loading/unloading zone 115 and the vision zone 120, the dual spindle counter rotating saw 125 in the sawing zone 110 is mounted on a cantilever arrangement. The cantilevered dual spindle counter rotating saw 125 is movably mounted to travel along a Y-axis relative to the transport system, and also movably mounted to extend along a Z-axis for moving to and away from the substrate or wafer to be sawn. Due to the weight of the dual spindle counter rotating saw 125, the load on the cantilever varies dependent upon the position of the saw motor assembly along the Y-axis. Consequently, the displacement of the saw assembly away from a reference horizontal plane also varies. Hence, a disadvantage of the cantilever mounted dual spindle counter rotating saw 125 is the tendency of variation in the displacement of the saw blades, and this variation adversely affects the required five micron tolerance for a cut made by the saw blades.

A scrap removal system of the sawing system 100 operates during the sawing process, where water washes various debris in the sawing zone 110 down a debris collection sink to a removable bin, where the debris is separated from the water. The bin containing the debris can then either be emptied and re-attached to the sawing system 100, or replaced with an empty bin. A disadvantage of this scrap removal system is the need to stop the sawing process prior to removing the bin, in order stop the flow of water and debris to the bin, and allow the bin containing the debris to be physically removed from the sawing system 100, without spilling water and debris in a production area. Consequently, the need to stop the sawing process reduces the throughput of the sawing system 100.

BRIEF SUMMARY OF THE INVENTION

The present invention seeks to provide a bi-directional singulation saw and method, which overcomes or at least reduces the abovementioned problems of the prior art.

Accordingly, in one aspect, the present invention provides a bi-directional singulation system for singulation of substrates, the bi-directional singulation system comprising:

a loading/unloading zone for mounting a carrier onto a first movable carrier support located thereat prior to singulation of at least one substrate disposed on the carrier, and the loading/unloading zone for unloading the carrier from the first movable carrier support located thereat after singulation of the at least one substrate;

a sawing zone comprising at least one bi-directional cutting means for singulating at least another substrate on another carrier mounted on a second movable carrier support, while the first movable carrier support is at the loading/unloading zone; and a vision zone located between the loading/unloading zone and the sawing zone, the vision zone comprising a vision system for imaging the at least one substrate when the first movable carrier support is at the vision zone, while the second movable carrier support is at the sawing zone.

In another aspect the present invention provides a method for singulating substrates with a bi-directional singulation system, the method comprising the steps of:

a) providing a bi-directional singulation system comprising:

a loading/unloading zone for mounting a first carrier onto a first movable carrier support and for unloading the first carrier from the first movable carrier support, and the loading/unloading zone for mounting a second carrier onto a second movable carrier support and for unloading the second carrier from the second movable carrier support;

a sawing zone comprising at least one bi-directional cutting means for singulating at least a first substrate and at least a second substrate; and a vision zone located between the loading/unloading zone and the sawing zone, the vision zone comprising a vision system for imaging the at least the first substrate and for imaging the at least the second substrate;

b) while singulating the at least the first substrate on the first movable carrier support at the sawing zone to produce the at least the first singulated first substrate, performing the steps of:

b1) mounting the second carrier with the at least the second substrate thereon on the second movable carrier support at the loading/unloading zone; and b2) imaging the at least the second substrate on the at least the second movable carrier support at the vision zone; and c) while singulating the at least the second substrate on the second movable carrier support at the sawing zone to produce the at least the second singulated substrate, performing the steps of:

c1) unloading the first carrier with the at least the first singulated substrate thereon on the first movable carrier support at the loading/unloading zone;

c2) mounting another carrier with at least another substrate thereon on the first movable carrier support at the loading/unloading zone; and c3) imaging the at least another substrate on the at least the first movable carrier support at the vision zone.

In yet another aspect the present invention provides a scrap removal system for removing debris in a bi-directional singulation system, the scrap removal system comprising:

a conveyor located substantially within a sawing zone of the bi-directional singulation system, the conveyor having an internal portion for to receive debris from a sawing process, and the conveyor having an external portion that extends outwardly away from the sawing zone, the conveyor for transporting the debris from the internal portion to the external portion for disposal.

BRIEF DESCRIPTION OF THE DRAWINGS

An embodiment of the present invention will now be more fully described, by way of example, with reference to the drawings of which:

FIGS. 6-1 to 6-7 show schematics of the sawing sequence of bi-directional sawing system in FIG. 2.

FIG. 7 shows a side sectional schematic view of a scrap removal system incorporated in the sawing system in FIG. 2; and FIG. 8 shows an isometric view of the scrap removal system in FIG. 7.

DETAIL DESCRIPTION OF THE DRAWINGS

The sawing system of the present invention incorporates a vision zone between a loading/unloading zone and a sawing zone. This arrangement allows the dual spindle counter rotating saw in the sawing zone to be mounted closer to one end of the system, rather than at an intermediate portion of the system. The result is a more rigid mounting than the intermediate cantilever mounting of the prior art. The more rigidly mounted dual spindle counter rotating saw assembly reduces the displacement of the saw assembly away from a reference horizontal plane when moving along the Y-axis during the sawing process. Thus, advantageously reducing the variation in the width of the cut made by the saw blades of the saw assembly to comply with the required tolerance of five micron.

In addition, with the vision zone located between the loading/unloading zone and the sawing zone, a semiconductor wafer or substrate for sawing is transported from the loading/unloading zone to the vision zone, without having to pass the sawing zone. Consequently, exposure of the a semiconductor wafer or substrate to water or debris from the sawing process prior to imaging is avoided, and imaging of the semiconductor wafer or substrate can be performed at the vision station without water or debris adversely affecting the imaging.

The sawing system of the present invention also employs a scrap removal system that uses a continuously moving conveyor. The moving conveyor is located within a sink above which the sawing process is performed in the sawing zone. Debris from the sawing process above falls on the moving conveyor below, while the water is filtered away. The moving conveyor transports the debris to a disposal location outside the sawing system, where the debris is allowed to fall off the conveyor and into a removable bin. The scrap removal system advantageously allows the removable bin to be changed without having to stop the sawing process, while at the same time avoiding spillage of water and debris in a production area.

Figure 2:
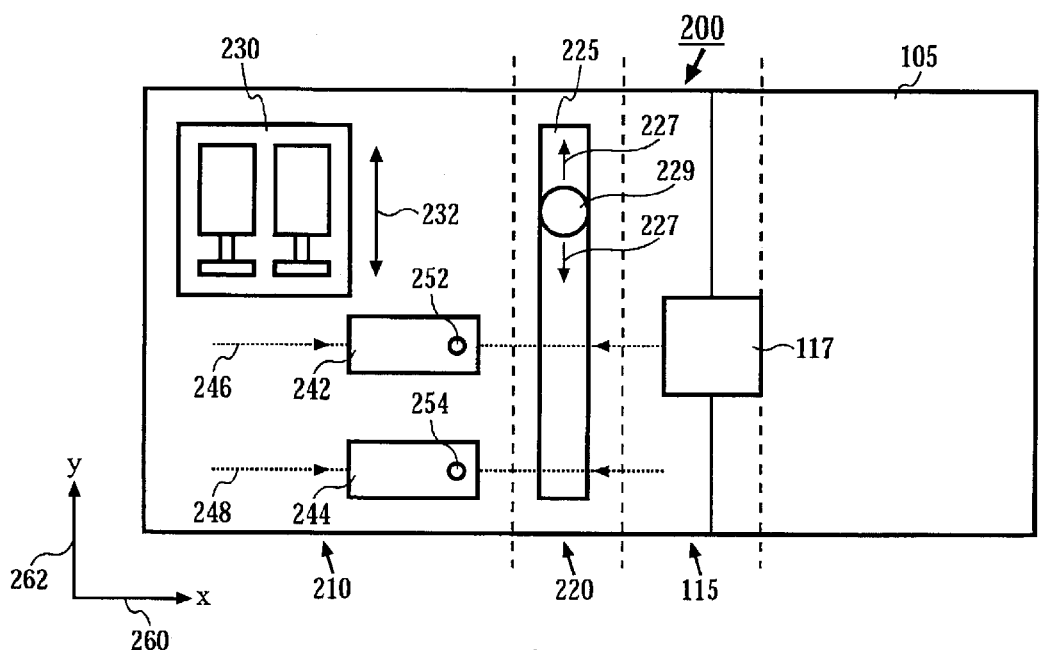
FIG. 2 shows a functional block diagram of a bi-directional sawing system in accordance with the present invention.

With reference to FIG. 2 a sawing system 200, in accordance with the present invention, is coupled to a handler 105, such handlers being known in the prior art. The sawing system 200 comprises a loading/unloading zone 115, a vision zone 220 and a sawing zone 210, arranged with the vision zone 220 physically located between the sawing zone 210 and the loading/unloading zone 115. The loading/unloading zone 115 provides a loading/unloading station 117 at which the handler 105 loads a carrier with a substrate or wafer thereon for sawing, and unloads the carrier after singulation.

The vision zone 220 includes a camera 229 that is mounted on a gantry 225, and includes a linear actuator to move the camera 230 along the gantry 225, thus moving the camera 229 along a Y-axis, as indicated by the arrows 227. The camera 230 is coupled to a vision system for image processing and the like.

The sawing zone 225 includes a dual spindle counter rotating saw 230 on a rigid mount. The dual spindle counter rotating saw 230 is also movably mounted for moving along the Y-axis, as indicated by the arrows 232. In addition, the dual spindle counter rotating saw 230 is also movably mounted to allow it movement along the Z-axis to move the saw blades of the dual spindle counter rotating saw 230, towards and away from, the wafer or substrate during the sawing process. The dual spindle counter rotating saw 230 comprises a rocking frame with a rocking shaft as disclosed in the U.S. patent application Ser. No. 09/849,049.

A linear transport system controls the independent movement of two carrier supports 242 and 244 along the transport paths 246 and 248, respectively. The two carrier supports 242 and 244 are rotatable about carrier support rotating shafts 252 and 254, respectively, between alignment with the X and Y axes 260 and 262.

Figure 3:
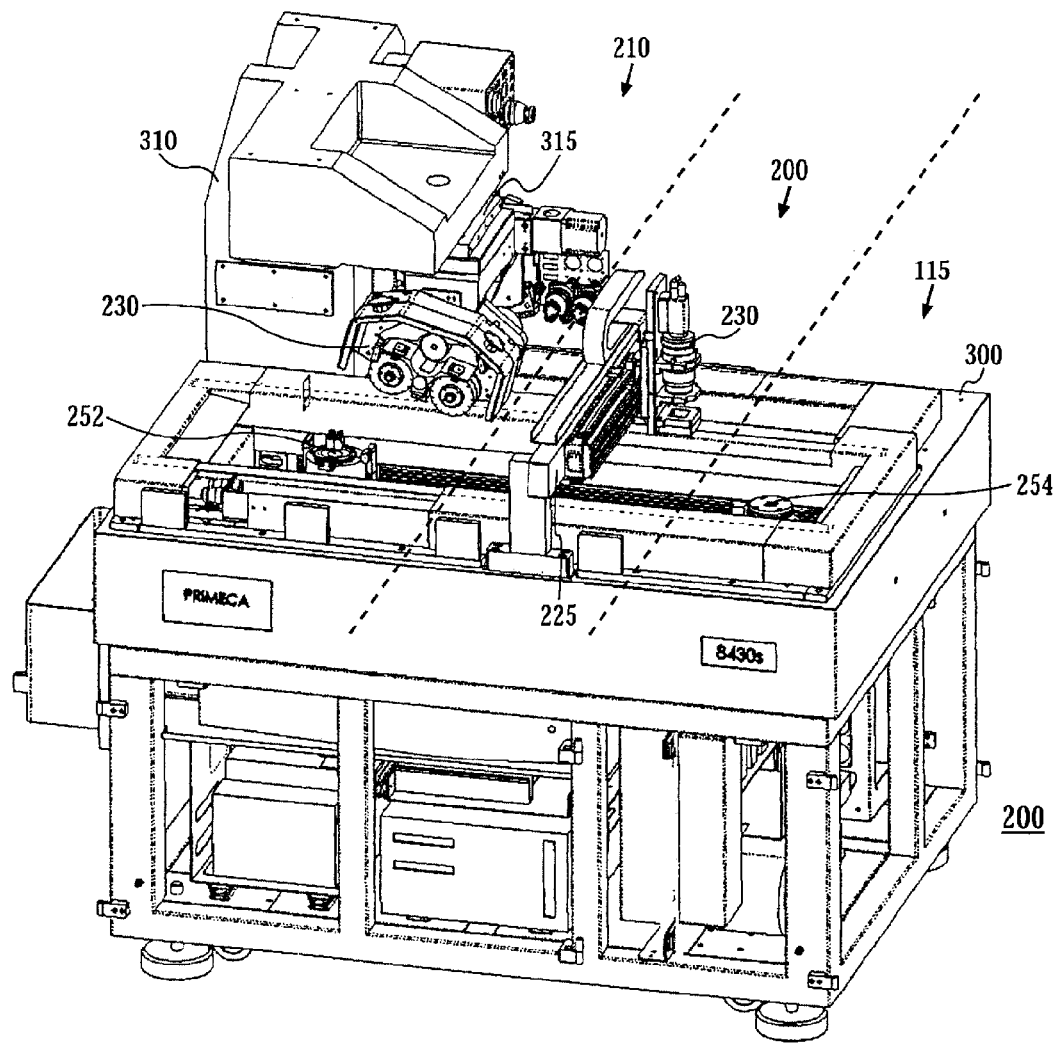
FIG. 3 shows an isometric view of a preferred embodiment of the present invention.

With reference now to FIG. 3 the sawing system 200 is shown with the two carrier supports 242 and 244 removed. One of the carrier support rotating shafts 252 is shown in the sawing zone 210 while the other carrier support rotating shaft 254 is shown in the loading/unloading zone 115. The dual spindle counter rotating saw 230 is mounted on a rigid support member 310, which is itself mounted to a base 300. The dual spindle counter rotating saw 230 is movably mounted to the rigid support member 310 to allow the dual spindle counter rotating saw 230 to be moved along the Y-axis by a linear actuator 315. In addition, the camera 230 is movably mounted on the gantry 225 by a linear actuator 320 for moving the camera 230 along the Y-axis, and for precisely locating the camera 230 thereon.

Figure 4:
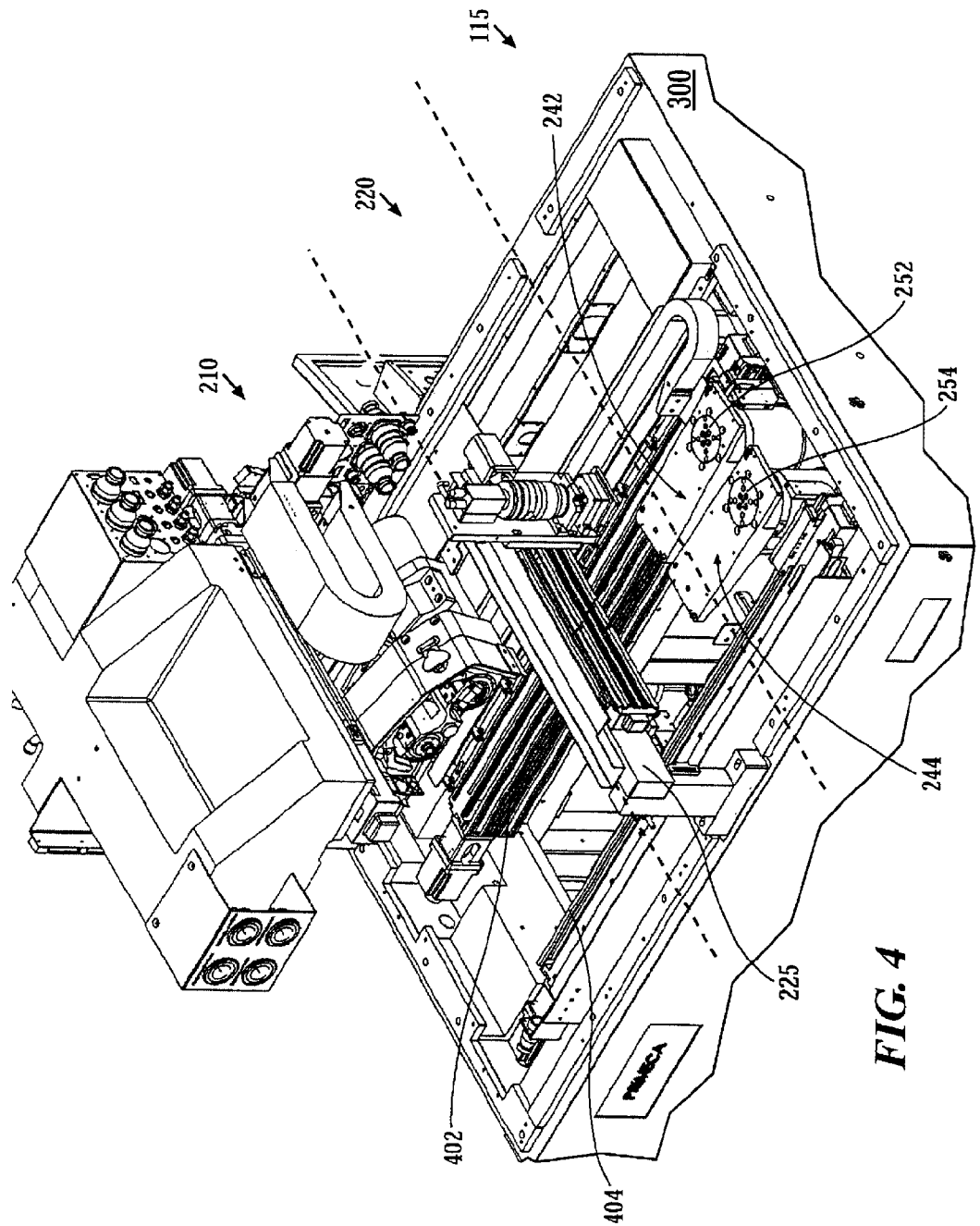
FIG. 4 shows an enlarged view of a portion of the preferred embodiment of the present invention in FIG. 3.

Referring to FIG. 4 the two carrier supports 242 and 244 are shown in the loading/unloading zone 115, and the linear actuators 402 and 404 that move the two carrier supports between the sawing zone 210, the vision zone 220, and the loading/unloading zone 115, are also shown. Linear encoders are incorporated with the linear actuators 402 and 404 for position registration.

Figure 1:
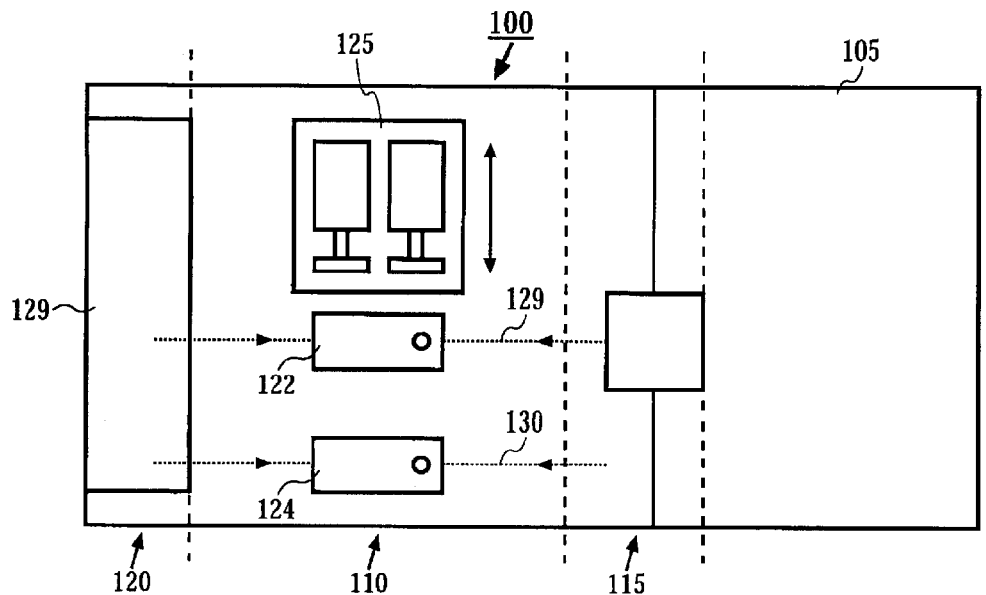
FIG. 1 shows a functional block diagram of a bi-directional sawing system in accordance with the prior art.
Figure 5:
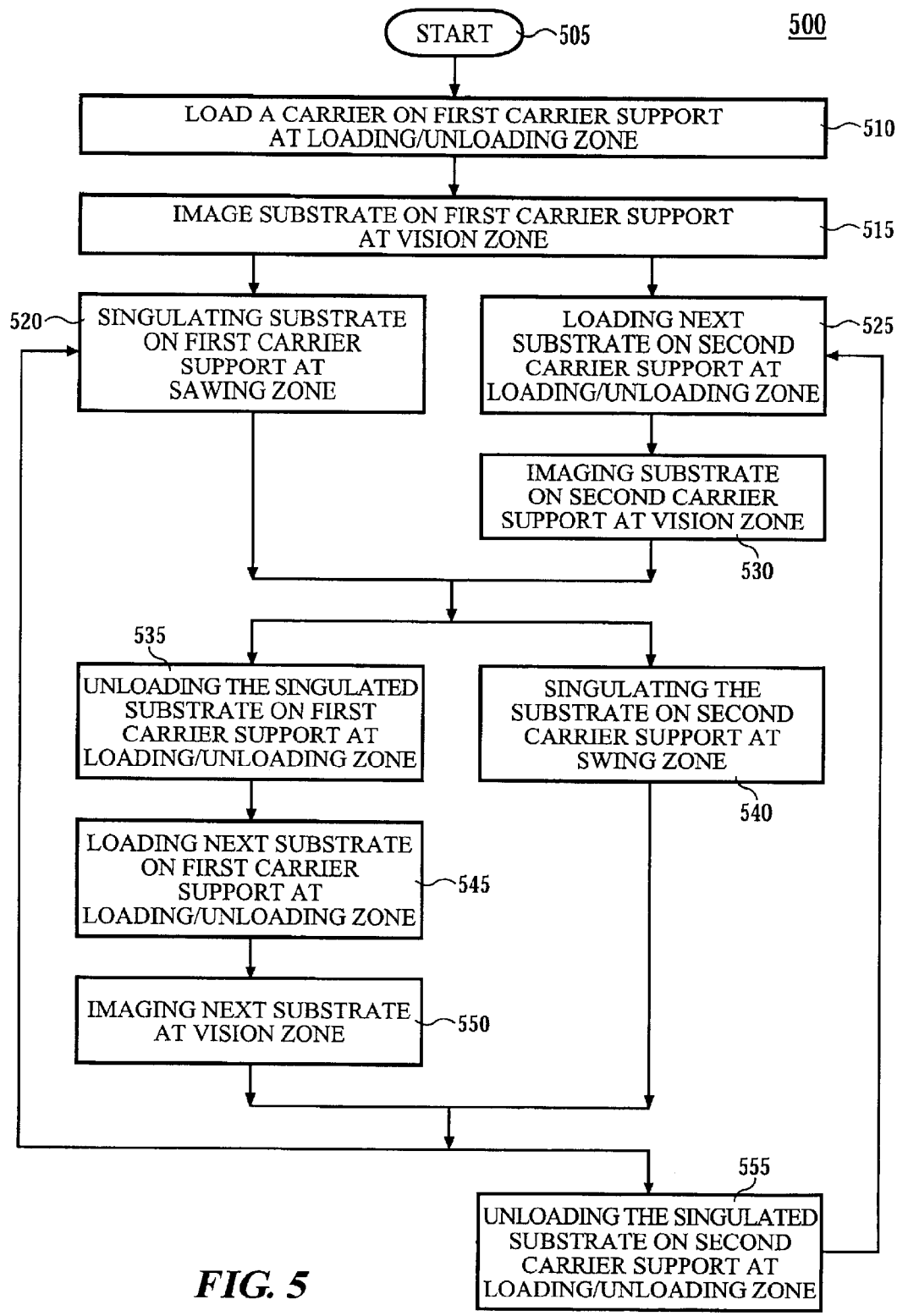
FIG. 5 shows a flow chart detailing the operation of the bi-directional sawing system in FIG. 2.
Figures 1, 6:
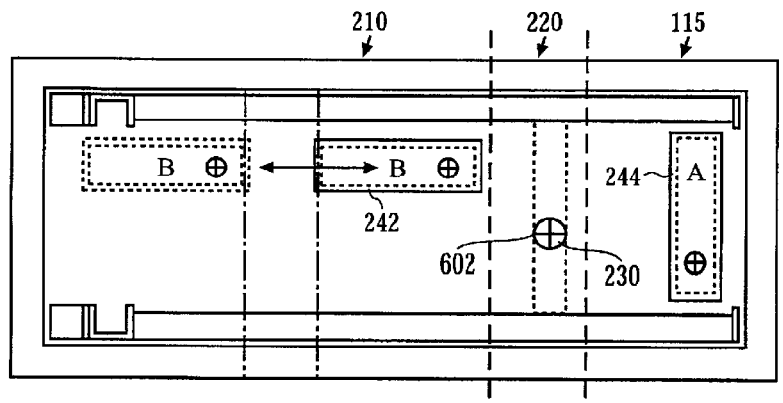
Figures 2, 6:
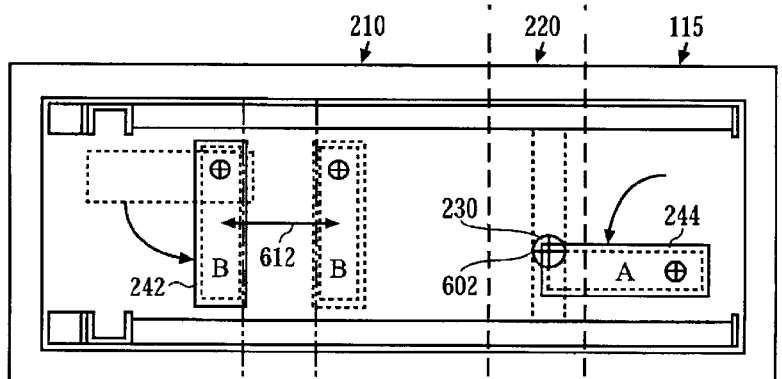
Figures 3, 6:
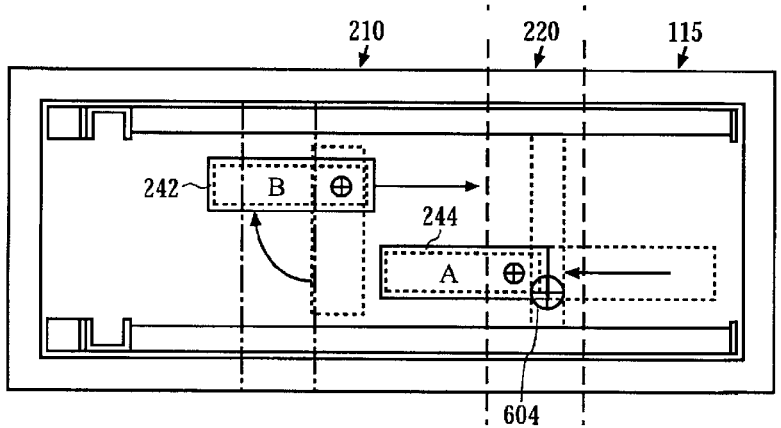
Figures 4, 6:
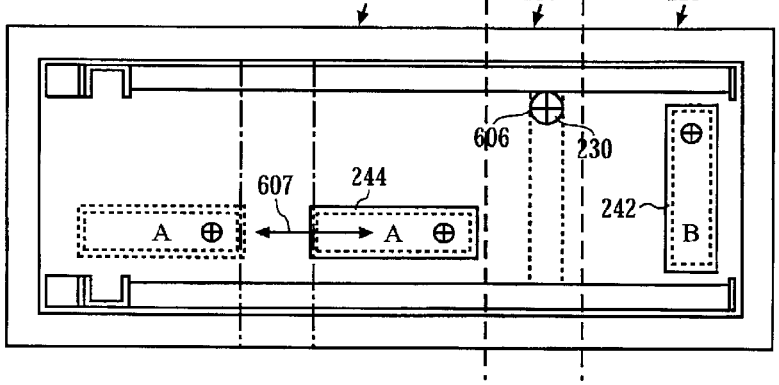

With additional reference now to FIG. 5 and FIGS. 6-1 to 6-7, the operation 500 of the sawing system 200 starts 505 with the handler 105 loading 510 a carrier onto the first carrier support 244 in the loading/unloading zone 115, and the camera 230 in vision zone 220 moving to a first vision check position 602. Typically, a vacuum is applied to secure the carrier on the first carrier support 244. This is shown in FIG. 6-1.

Note that although the other carrier support 242 is also operating, for the sake of simplifying the description, initially, only the operation of the component carrier 242 will be described. Later the description will be expanded to include the operation of the other carrier support 242.

Next, with reference to FIG. 6-2, the first carrier support 244 then rotates through a right angle i.e. from alignment with the Y-axis to alignment with the X-axis, and the camera 230 is then operated to perform the first vision check on the substrate or wafer on the first carrier support 244, in the vision zone 220.

Subsequently, referring to FIG. 6-3, the first carrier support 244 moves along the X-axis and the camera 230 moves to the second vision check position 604. The camera 230 is then operated to perform the second vision check. The first and second vision checks constitutes imaging 515 of a substrate or wafer on the first carrier support 244 in the vision zone 220, and the imaging information is used by a vision system for alignment of the substrate or wafer on the first carrier support during the subsequent sawing process in the sawing zone 210.

Referring to FIG. 6-4, after imaging, the first carrier support 244 moves to the sawing zone 210. Here, the dual spindle counter rotating saw 230 cuts the substrate or wafer lengthwise with alternate counter rotating blades as the first carrier support 244 moves the substrate or wafer to and from under the dual spindle counter rotating saw 230, indicated by the arrows 607; and the dual spindle counter rotating saw 230 is incrementally moved along the Y-axis after each pass of the saw blades until the whole substrate or wafer has been cut lengthwise. This process is one part of singulating 520 the wafer or substrate in the sawing zone 210.

Concurrently, while the first carrier support 244 is in the sawing zone 210 during the sawing process, the second carrier support 242 is loaded 525 in the loading/unloading zone 115 with another carrier having a substrate or wafer thereon, and the camera 230 is moved to a first vision check position 606.

With reference to FIG. 6-5, after the whole substrate or wafer has been cut lengthwise, the first carrier support 244 rotates to align the substrate or wafer widthwise. Here, the dual spindle counter rotating saw 230 cuts the substrate or wafer widthwise, as the first carrier support 244 carries the substrate or wafer to and from under the dual spindle counter rotating saw 230 as indicated by the arrows 609; and the dual spindle counter rotating saw 230 is incrementally moved along the Y-axis after each pass until the whole substrate or wafer has been cut widthwise. This completes the singulating 520 process of the substrate or wafer in the sawing zone 210.

Concurrent with the widthwise cutting, the second carrier support 242 rotates to align with the X-axis, and the camera 230 is operated to perform the first vision check at the first vision check position 606.

Referring to FIG. 6-6, after the singulation of the substrate or wafer on the first carrier support 244 is completed, the first carrier support 244 rotates back to align with the X-axis, and then moves along the X-axis transporting the singulated substrate or wafer to the loading/unloading zone 115, as indicated by the arrow 610.

At about the same time, the second carrier support 242 moves to align with the second vision check position 608. The camera 230, which had moved to the second vision check position 608, is then operated to perform the second vision check at the second vision check position 608. Again, the first and second vision checks constitute imaging 530 of the substrate or wafer on the second carrier support 242 in the vision zone 220, and the imaging information is used by a vision system for alignment of the substrate or wafer on the second carrier support 242 during the subsequent sawing process in the sawing zone 210

Figure 7:
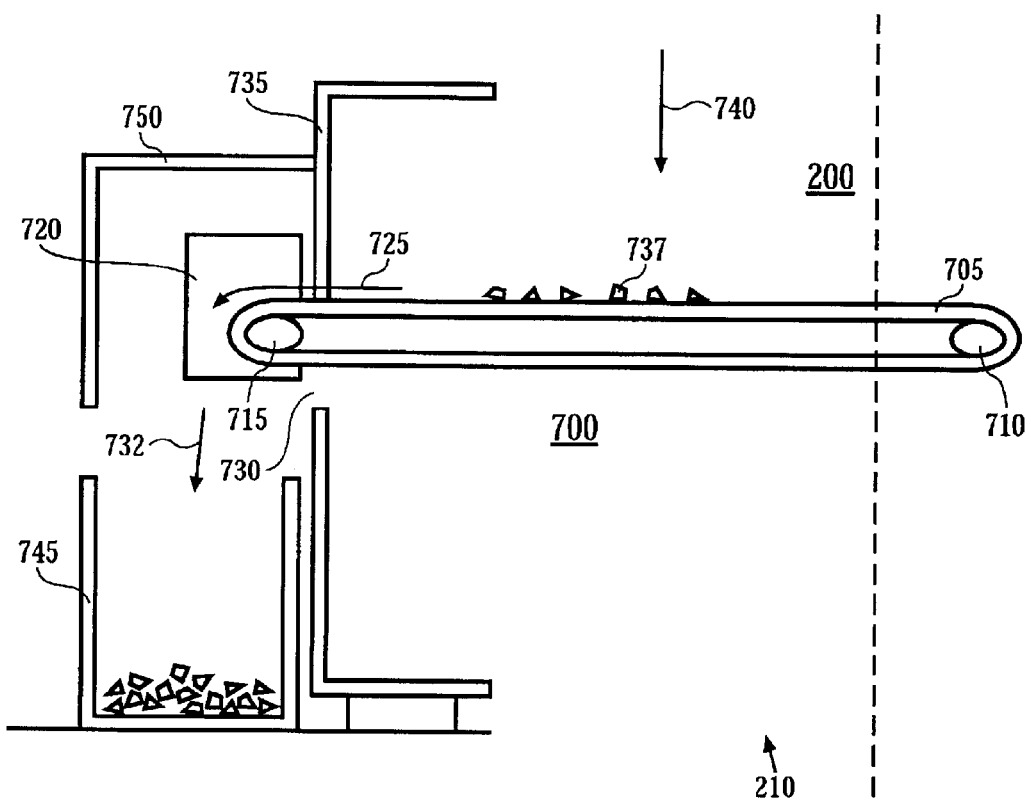

With reference to FIG. 6-7 the second carrier support 242 moves along the X-axis to transport the substrate or wafer from the vision zone 220 to the sawing zone 210. At the sawing zone 210, the dual spindle counter rotating saw 230 cuts the substrate or wafer lengthwise, as the second carrier support 242 moves the substrate or wafer to and from under the dual spindle counter rotating saw 230; and the dual spindle counter rotating saw 230 is incrementally moved along the Y-axis after each pass until the whole substrate or wafer has been cut lengthwise. This process is a part of singulating 540 the wafer or substrate in the sawing zone 210.

Concurrently, while the second carrier support 242 is in the sawing zone 210, the carrier with the singulated substrate or wafer on the first carrier support 242 is unloaded 535 and another carrier having a substrate or wafer thereon is loaded 545 onto the first carrier support 244 in the loading/unloading zone 115.

Now returning to FIG. 6-2, while the second carrier support 242 moves, rotates and begins sawing the substrate or wafer on the second carrier support 242 widthwise, as indicated by the arrows 612, the first carrier support 244: rotates to align the substrate or wafer thereon with the first vision check position 602; and moves to the second vision check position 604. Again, first and second vision checks are performed by the camera 230 and a vision system at the vision check positions 602 and 604, thus performing the imaging step 550 of the substrate or wafer on the first carrier support 244.

In FIG. 6-3, after the singulation of the substrate or wafer on the second carrier support 242 at the sawing zone 210 is completed, the second carrier support 242 moves to the loading/unloading zone 115, as shown in FIG. 6-4, where the carrier with the singulated substrate or wafer thereon is unloaded. The process 500 then repeats as described above for subsequent carriers.

Hence, the arrangement of a vision zone between a sawing zone and a loading/unloading zone advantageously allows substrates or wafers to be imaged without being exposed to water and debris prior to imaging. This improves the imaging, and consequently, the accuracy of the sawing process.

With reference to FIG. 7 a scrap removal system 700 comprises a conveyor 705 transported by two rollers 710 and 715 located at opposite ends of the system 700. One of the rollers 710 is driven by a motor assembly 720 that drives the conveyor 705 in the direction shown by the arrow 725. The scrap removal system 700 comprises an integrated system that is slid into place via an opening 730 in the side of the base 735 of the sawing system 200. The integrated construction of the scrap removal system 700 allows the complete system to be conveniently removed for repair or replacement.

When the scarp removal is slid in place, a substantial portion of the conveyor 705 is located within the sawing zone 210, below the location of the dual spindle counter rotating saw 230. During the sawing process, water and debris 737 fall onto the conveyor 705 as indicated by the arrow 740. The water drains off the conveyor 705 but the debris 737 remains on the conveyor 705 and is carried by the conveyor 705 outside the sawing system 200 through the opening 730. The conveyor can comprise belting that may be made of water permeable material to aid in filtering the water away. Then when the conveyor 705 rolls around the roller 715, the debris 737 falls off the conveyor 705, as indicated by the arrow 732 into a removable bin 745, located outside the sawing system 200 and below the roller 715.

A cover 750 covers the end of the scrap removal system 700 that protrudes from the opening 730 to prevent the debris 737 and water on the conveyor 705 from being disposed away from the removable bin 745. The removable bin 745 can be replaced at any time for emptying when the accumulation of debris 737 in the removable bin 745 is excessive.

With reference to FIG. 8 the scrap removal system 700 is shown positioned within sawing system 200 via the opening 730. The cover 750 and the removable bin 745 are not shown for clarity.

The scrap removal system of the present invention, as described, advantageously transports debris to a removable bin outside the sawing system, and allows the removable bin to be replaced at any time without the need to stop the sawing system.

The sawing system of the present invention, as described, advantageously has a vision zone located between a loading/unloading zone and a sawing zone. As a substrate or wafer is transported from the loading/unloading zone to the vision zone and then to the sawing zone, subsequent substrates or wafers that are transported from the loading/unloading zone to the vision zone while a previous substrate or wafer is being sawn at the sawing zone, are not exposed to water and debris of the sawing process.

This is accomplished with a camera mounted on gantry that is located between the loading/unloading zone and the sawing zone, and employing a transport system that comprises two independent carrier supports. When one carrier support transports a carrier with a substrate or a wafer thereon in the sawing zone during the sawing process, the other carrier support prepares another carrier for the sawing process, or unloads a carrier that has been through the sawing process. Consequently, loading, unloading and imaging occur concurrently, and having the imaging between the loading/unloading zone and the sawing zone avoids water and debris adversely affecting the imaging.

Thus, the present invention as described provides an improved bi-directional singulation saw and method, which overcomes or at least reduces the abovementioned problems of the disclosed system.

It will be appreciated that although only particular embodiments of the invention have been described in detail, various modifications and improvements can be made by a person skilled in the art without departing from the scope of the present invention.

We claim:

1. A method for singulating substrates with a bi-directional singulation system, the method comprising the steps of:
   a) providing a bi-directional singulation system comprising:
      a loading/unloading zone for mounting a first carrier onto a first movable carrier support and for unloading the first carrier from the first movable carrier support, and the loading/unloading zone for mounting a second carrier onto a second movable carrier support and for unloading the second carrier from the second movable carrier support;
      a sawing zone comprising at least one bi-directional cutting means for singulating at least a first substrate and at least a second substrate; and
      a vision zone located between the loading/unloading zone and the sawing zone, the vision zone comprising a vision system for imaging the at least the first substrate and for imaging the at least the second substrate;
   b) while singulating the at least the first substrate on the first movable carrier support at the sawing zone to produce the at least the first singulated first substrate, performing the steps of:
      b1) mounting the second carrier with the at least the second substrate thereon on the second movable carrier support at the loading/unloading zone; and b2) imaging the at least the second substrate on the at least the second movable carrier support at the vision zone; and c) while singulating the at least the second substrate on the second movable carrier support at the sawing zone to produce the at least the second singulated substrate, performing the steps of:
- c1) unloading the first carrier with the at least the first singulated substrate thereon on the first movable carrier support at the loading/unloading zone;
- c2) mounting another carrier with at least another substrate thereon on the first movable carrier support at the loading/unloading zone; and
- c3) imaging the at least another substrate on the at least the first movable carrier support at the vision zone.

2. A method for singulating substrates in accordance with claim 1 further comprising after step b1 and before step b2 the step of transporting the second movable carrier support from the loading/unloading zone to the vision zone without passing the sawing zone.

3. A method for singulating substrates in accordance with claim 1 further comprising after step c2 and before step c3 the step of transporting the first movable carrier support from the loading/unloading zone to the vision zone without passing the sawing zone.

* * * * *